United States Patent [19]

Sayer

[11] Patent Number: 4,923,667
[45] Date of Patent: May 8, 1990

[54] METHOD AND APPARATUS FOR INJECTION MOULDING

[75] Inventor: Matthew E. Sayer, Tamworth, England

[73] Assignee: Cinpres Limited, Staffordshire, England

[21] Appl. No.: 248,539

[22] Filed: Sep. 23, 1988

[30] Foreign Application Priority Data

Sep. 25, 1987 [GB] United Kingdom ............... 8722620

[51] Int. Cl.⁵ .................... B29C 45/00; B29C 45/34; B29D 22/00
[52] U.S. Cl. ............................ 264/572; 264/102; 264/154; 264/328.1; 264/328.8; 425/546; 425/547; 425/567; 425/812; 425/DIG. 58
[58] Field of Search .............. 264/101, 102, 328.1, 264/328.8, 572, 154, 155; 425/546, 547, 567, 572, 812, DIG. 58, DIG. 245

[56] References Cited

U.S. PATENT DOCUMENTS

| | | |
|---|---|---|
| 2,105,704 | 1/1938 | Shippy . |
| 2,331,688 | 10/1943 | Hobson . |
| 3,021,559 | 2/1962 | Strong . |
| 3,114,931 | 12/1963 | Pelikan . |
| 3,358,062 | 12/1967 | Lemelson . |
| 3,366,993 | 2/1968 | Lemelson . |
| 3,378,612 | 4/1968 | Dietz . |
| 3,575,949 | 4/1971 | Humphrey . |
| 3,793,415 | 2/1974 | Smith . |

(List continued on next page.)

FOREIGN PATENT DOCUMENTS

| | | |
|---|---|---|
| 127961 | 12/1984 | European Pat. Off. . |
| 1265395 | 4/1968 | Fed. Rep. of Germany . |
| 2106546 | 8/1972 | Fed. Rep. of Germany . |
| 2655255 | 6/1977 | Fed. Rep. of Germany . |
| 2800482 | 4/1978 | Fed. Rep. of Germany . |
| 2256021 | 7/1975 | France . |
| 54-123173 | 9/1979 | Japan . |
| 945234 | 12/1963 | United Kingdom . |
| 996186 | 6/1965 | United Kingdom . |
| 1076047 | 7/1967 | United Kingdom . |
| 1106567 | 3/1968 | United Kingdom . |
| 1167513 | 10/1969 | United Kingdom . |
| 2122130 | 1/1984 | United Kingdom . |
| 2139548 | 11/1984 | United Kingdom . |
| 2139549 | 11/1984 | United Kingdom . |
| 2158002 | 11/1985 | United Kingdom . |

OTHER PUBLICATIONS

Plastics Technology, Swirl-Free Foam Parts, May 1976, pp. 33–36, Union Carbide.

(List continued on next page.)

Primary Examiner—Jeffery Thurlow
Assistant Examiner—Leo B. Tentoni
Attorney, Agent, or Firm—Beveridge, DeGrandi & Weilacher

[57] ABSTRACT

An injection molded plastic article is produced by introducing a stream of molten plastic material from an injection molding machine cylinder into an article forming mold space. Pressurized gas is supplied into the interior of the molten plastic material to form a gas containing cavity therein. The plastic material is then allowed to solidify and cool sufficiently so that the article can itself sustain the form dictated by the mold surface. The cavity is vented to reduce the pressure within the cavity to ambient pressure prior to opening of the mold. The step of venting the cavity is achieved by providing at least one position which is separate from the plastic inlet and the gas inlet a vent passage in the mold open at its inner end to a part of the interior of the mold at which the gas containing cavity is formed, and a retractable closure for opening and closing the vent passage at its inner end, maintaining the closure in its closed position during the forming of the article whereby the cavity wall is formed over the inner end of the vent passage and the closure therefor, and subsequently retracting the closure to allow the creation of a vent opening in the cavity wall in the area of the inner end of the vent passage through which vent opening gas from the cavity passes into the vent passage. Apparatus for carrying out the above process is also described.

20 Claims, 5 Drawing Sheets

4,923,667

Page 2

U.S. PATENT DOCUMENTS

| | | |
|---|---|---|
| 3,793,421 | 2/1974 | Paubandt . |
| 3,873,661 | 3/1975 | Kontz . |
| 3,899,278 | 8/1975 | Fead et al. . |
| 4,017,225 | 4/1977 | Hanning . |
| 4,033,710 | 7/1977 | Hanning . |
| 4,070,429 | 1/1978 | Uhlig . |
| 4,101,617 | 7/1978 | Friederich . |
| 4,115,491 | 9/1978 | Hanning . |
| 4,129,635 | 12/1978 | Yasuike et al. . |
| 4,136,220 | 1/1979 | Olabisi . |
| 4,140,672 | 2/1979 | Kataoka . |
| 4,201,742 | 5/1980 | Hendry . |
| 4,234,642 | 11/1980 | Olabisi . |
| 4,247,515 | 1/1981 | Olabisi . |
| 4,389,358 | 6/1983 | Hendry . |
| 4,474,717 | 10/1984 | Hendry . |
| 4,498,860 | 2/1985 | Gahan . |
| 4,555,225 | 11/1985 | Hendry . |
| 4,740,150 | 4/1988 | Sayer . |

OTHER PUBLICATIONS

Engineering & Processing News, Through-the-Nozzle Gas Injection Produces Class A Foam Parts, Mar. 1980, pp. 22–24, Asahi-Dow.

Machine Design, The Best of Two Worlds in Plastic Processing, Dec. 9, 1982, pp. 99–102.

Eureka Transfers Technology, Gas Injection Relieves Moulding Stresses, Jun. 1985, p. 31.

Plastics Machinery and Equipment, Gas-Cored Injection Techniques Go Into Production, Nov. 1985, p. 24.

Plastics Technology, New Automotive PP, HDPE Applications Tested in Europe, Nov. 1985, p. 106.

Modern Plastics, Process Molds Rigid, Smooth Parts that are Stress Free, Nov. 1985, p. 26.

British Newspaper Article, Plastics After Deal Clinched, by John Baker, sometime prior to Oct. 1, 1985.

Applied Technology, Plastic Moulding Process Give More Design Freedom, single page, sometime in or before 1985.

Moulding System with Body Appeal, undated, source unknown.

Cinpres Presentation Summary Brochure, Controlled Internal Pressure Process ("CINPRES"), Sep./Oct. 1985.

Cinpress Brochure, Cost Saving with Cinpres.

European Plastics News, Advanced Injection Moulding Process, Jun. 1985.

Plastics & Rubber Weekly, New Foam Process Hybrid is 'Biggest Boon Since Screw', Apr. 27, 1985, p. 18.

Cinpres News, Aug. 1987.

Hoechst Plastics, Injection Moulding of Thermoplastics, Dec. 1972.

Netstal, Setting Up for Injection, Feb. 1973.

Three CINPRES Sales Pamphlets.

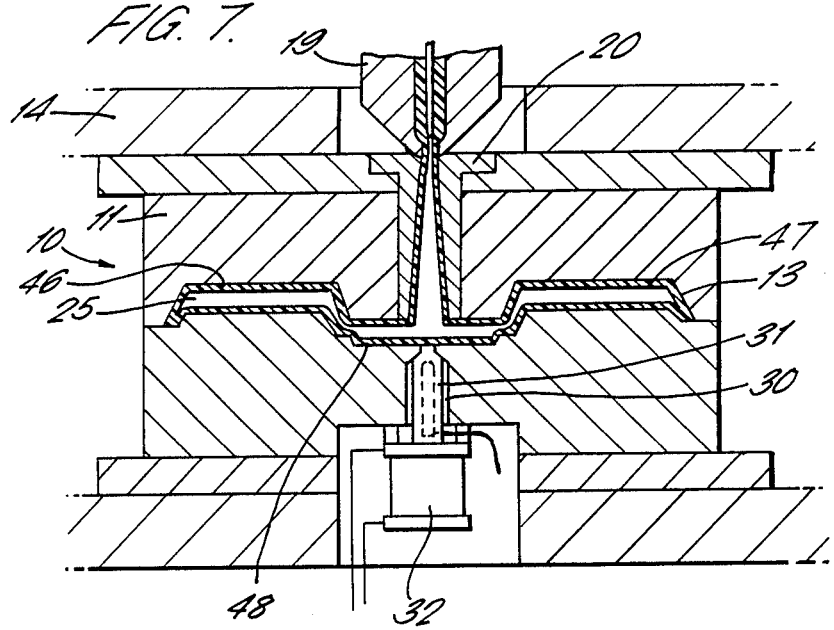
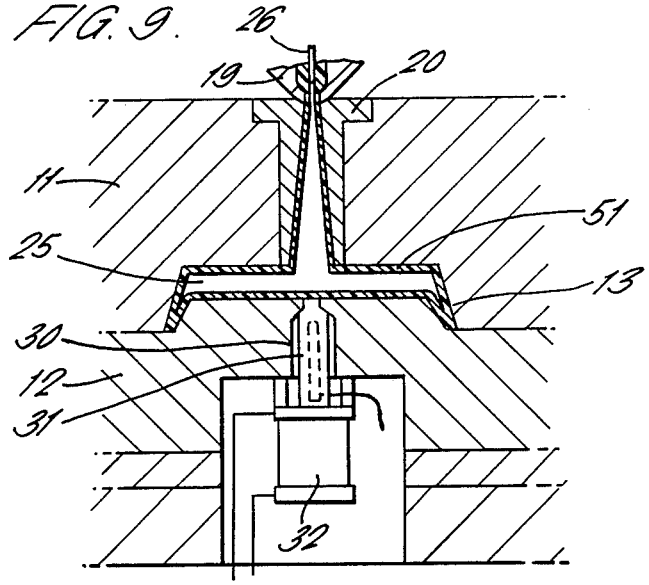

METHOD AND APPARATUS FOR INJECTION MOULDING

BACKGROUND OF THE INVENTION

1. Field of the Invention

This invention relates to a method and apparatus for injection molding.

More particularly the invention concerns the production of injection molded plastic articles by introducing a stream of molten plastic material from an injection molding machine cylinder into an article forming mold space, and supplying pressurized gas into the interior of the molten plastic material to form a cavity therein. When the plastic material has solidified and cooled sufficiently so that the article can itself sustain the form dictated by the mold surface, the gas containing cavity is vented to reduce the pressure within the cavity to ambient pressure. The mold is then opened to allow the molded article to be removed therefrom.

2. Prior Art

It is known to introduce the gas through the injection nozzle which introduces the plastic material, and then to vent the cavity by a step known as "sprue break" in which the nozzle is withdrawn from the mold whereby a gap is created between the nozzle and the mold which allows the gas to pass from the cavity to atmosphere. However, some molding machines are not equipped to permit sprue break. Also, it may be considered undesirable to vent the gas, e.g. nitrogen, into the environment of the molding machine for health reasons. In each case, it would be preferable to vent the cavity at another position in the mold, if desired in a manner in which the gas may be readily channelled to a factory vent.

Forming openings during molding operations is known per se. For example, it is known to generate a high excess pressure to cause a blow-mold to burst in the zone of an orifice to form a desired opening. Such a method would not be an acceptably controlled manner of venting.

It is also known to create a vent opening mechanically in the cavity wall of a molded article by piercing or boring. However, the act of piercing would not itself ensure that the gas would be permitted to escape unless the piercing tool is first inserted and then withdrawn. If a hollow piercing tool is used, venting would be achieved, but it would be difficult to prevent the hollow tool from being blocked by plastic material during the step of introducing the plastic material into the mold space. The same would apply to the provision of a drill for boring a hole in the cavity wall. Thus both previously proposed methods are disadvantageous because they are slow, thereby adding to the molding cycle time, and are impracticable.

It has further been suggested to seal the hole in the cavity wall through which the gas enters the cavity, by injecting a further quantity of plastic material, prior to the step of venting the cavity. Such a step may be disadvantageous because, with the hole blocked, it is no longer possible to alter the gas pressure within the cavity and thereby to maintain control of the gas pressure.

In a still further known arrangement, there is provided in association with the supply of pressurized gas a valve port for opening the cavity to atmosphere and a valve member for closing the port. During the supply of pressurized gas, the valve member is closed but the valve port is maintained open to the cavity. Thereby, after a molding operation has been finished, the cavity can be vented by opening the valve member to connect the still open valve port to atmosphere.

In another known arrangement for injection molding, a pin is positioned in the inner end of a vent passage for movement between an extended position in which the vent passage is closed and a retracted position in which the vent passage is open, and means are provided for moving the pin between its extended and retracted positions. However, in this arrangement, the inner end of the vent passage is not open to a part of the interior of the mold at which the gas containing cavity is to be formed. Also, as in other known arrangements, at the end of the molding operation a vent opening exists in the cavity wall. The vent opening is not created by or on retraction of the pin.

SUMMARY OF THE INVENTION

According to the invention there is provided a method of producing an injection molded plastic article comprising introducing a stream of molten plastic material from an injection molding machine cylinder into an article forming mold space, supplying pressurized gas into the interior of the molten plastic material to form a gas containing cavity therein, allowing the plastic material to solidify and cool sufficiently so that the article can itself sustain the form dictated by the mold surface, and venting the cavity to reduce the pressure within the cavity to ambient pressure prior to opening of the mold, the step of venting the cavity being achieved by providing at at least one position which is separate from the plastic inlet and the gas inlet a vent passage in the mold open at its inner end to a part of the interior of the mold at which the gas containing cavity is formed, and a retractable closure for opening and closing the vent passage at its inner end, maintaining the closure in its closed position during the forming of the article whereby the cavity wall is formed over the inner end of the vent passage and the closure therefor, and subsequently retracting the closure to allow the creation of a vent opening in the cavity wall in the area of the inner end of the vent passage through which vent opening gas from the cavity passes into the vent passage.

In one embodiment on retraction of the closure the cavity wall is unsupported and the pressure of the gas within the cavity ruptures the cavity wall and thereby creates the vent opening.

Another embodiment comprises immersing a part of the closure in the cavity wall as it is formed to produce weak lines in the cavity wall whereby on retraction of the closure the weak lines assist the pressure of the gas to rupture the cavity wall and thereby create the vent opening.

A further embodiment comprises immersing a part of the closure in the cavity wall as it is formed to produce weak lines in the cavity wall whereby on retraction of the closure the weak lines assist the removal of a section of the cavity wall and thereby the creation of the vent opening. The part of the closure to be immersed may be undercut whereby retraction of the closure pulls said section from the cavity wall.

If desired heat may be applied at the inner end of the vent passage to assist the creation of the vent opening, for example, by applying heat to the closure.

The invention also provides apparatus for producing an injection molded plastic article comprising means for introducing a stream of molten plastic material from an injection molding machine cylinder into an article forming mold space, means for supplying pressurized gas into the interior of the molten plastic material to form a gas containing cavity therein, and at at least one position which is separate from the plastic inlet and the gas inlet a vent passage in the mold open at its inner end to a part of the interior of the mold at which the gas containing cavity is to be formed, a retractable closure positioned in the inner end of the vent passage for movement between an extended position in which the vent passage is closed and a retracted position in which the vent passage is open, and means for moving the closure between its extended and retracted positions.

In one embodiment, the inner end of the vent passage is open to the article forming mold space. In another embodiment the inner end of the vent passage is open to a part of the interior of the mold which is upstream of the article forming mold space.

Preferably the closure has a conical surface which engages a correspondingly shaped valve seat in the vent passage when the closure is in its extended position thereby closing the vent passage.

In one embodiment a part of the closure, in its extended position, becomes immersed in the cavity wall as it is formed, said part of the closure may also be shaped to assist the removal of a section from the cavity wall when the closure is retracted.

Preferably the closure is a pin extending lengthwise of the vent passage.

Means may be provided for applying heat at the inner end of the vent passage. For example, heating means may be provided internally of the closure.

The means for moving the closure is preferably a piston and cylinder.

In one embodiment the outer end of the vent passage is open to atmosphere. Alternatively, the vent passage may be connected to a factory vent or to means for collecting the gas.

BRIEF DESCRIPTION OF THE DRAWINGS

FIGS. 7 to 9 show further embodiments of injection molding machines in accordance with the invention and incorporating a gas venting pin at a variety of different positions in the mold.

DESCRIPTION OF THE PREFERRED EMBODIMENTS

This example is a development of a process for producing injection moldings which is described generally in British Patent Specification No. 2139548. In that process there is provided a screw ram for introducing plastic material into a mold space, and a passageway through which pressurized gas is introduced under controlled conditions to create a gas containing cavity in the plastic material. Pressurization in the gas is maintained whereby the pressurized gas in the plastic material causes the plastic material to flow throughout the mold space with the gas containing cavity within the plastic material, the cavity thereby extending with the plastic material. When the plastic material has extended over the whole of the mold space, the gas pressure within the cavity is still maintained to hold the plastic material positively against the mold surface as the plastic material solidifies and cools until the molding can itself sustain the form dictated by the mold surface. Valve means are then opened for relieving the gas pressure within the gas containing cavity before the mold is opened.

In the known process, the position for introducing the pressurized gas may be at one or more selected positions either within the mold space or upstream of the article forming mold space. In each position, the gas is introduced through the respective passageway, and likewise emitted from the cavity through the same passageway during the subsequent venting stage of the molding cycle.

In the present development of the above described process, the position for introduction of the pressurized gas may be similarly varied, although in a preferred arrangement, as in each embodiment described below, the pressurized gas is introduced through the injection nozzle for the plastic material. The difference of the present development compared with the known process is that separate means are provided for venting the gas containing cavity.

Figure 1:
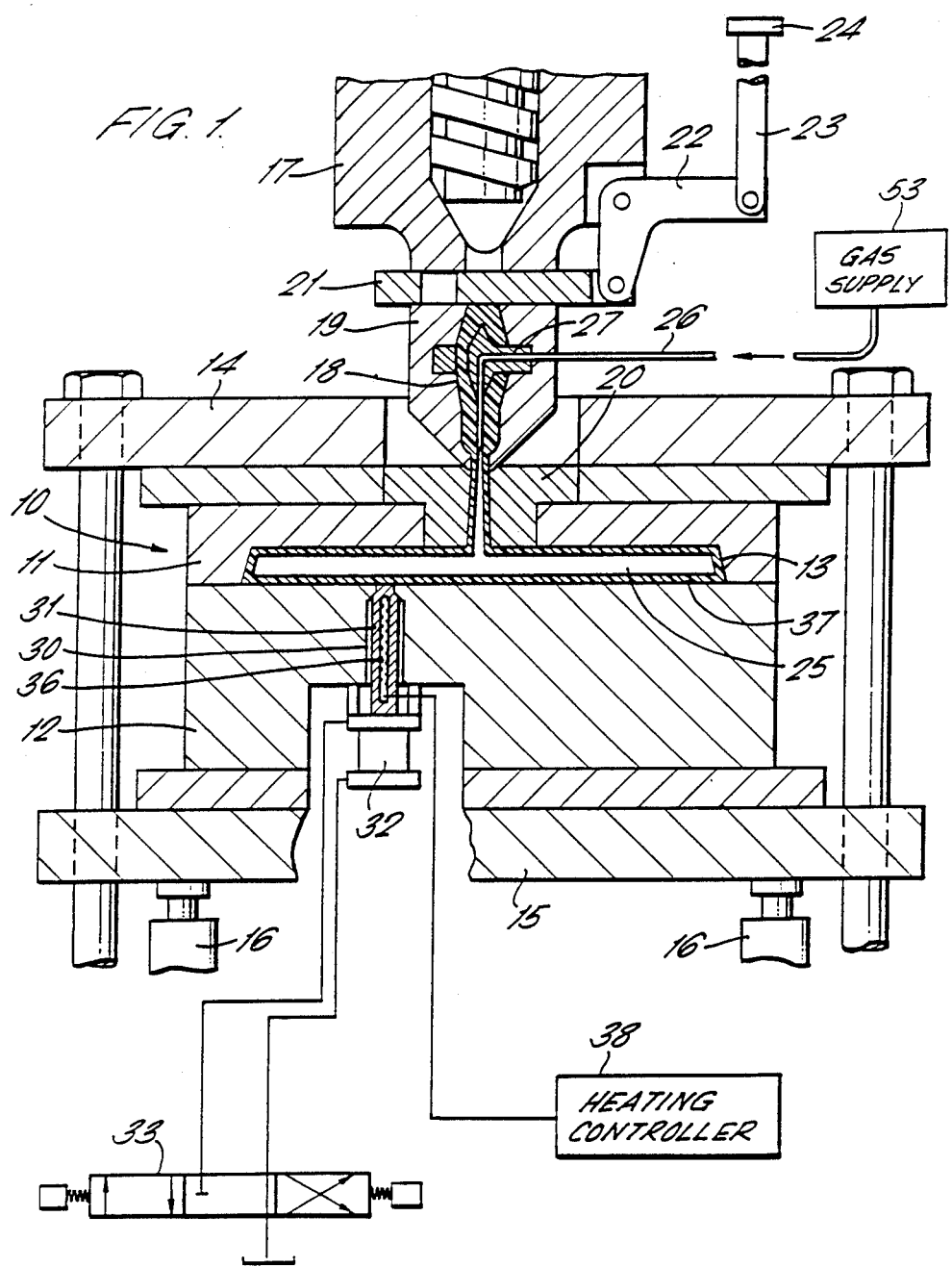
FIG. 1 shows, by way of example, an injection molding machine, in section.
Figure 2:
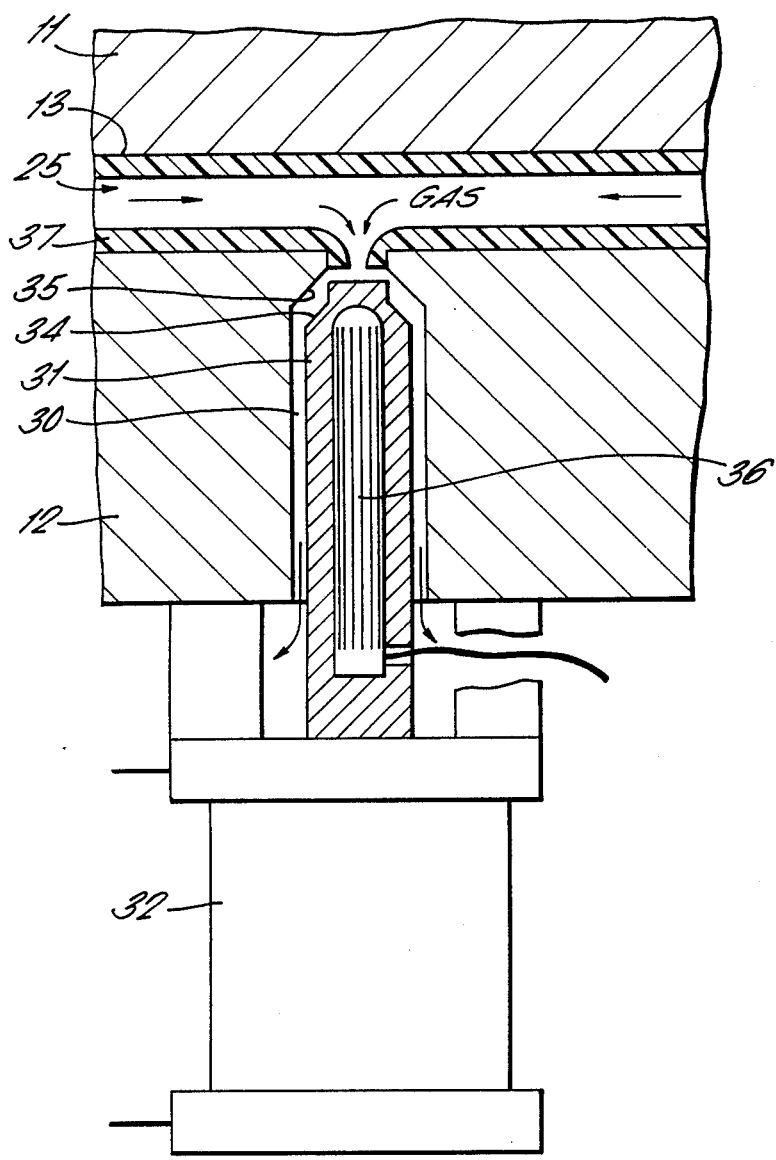
FIG. 2 is a detail sectional view of the retractable venting pin of the injection molding machine of FIG. 1.

Referring to FIGS. 1 and 2 of the drawings, a mold 10 of an injection molding machine has upper and lower parts 11, 12 defining an article forming mold space 13. The mold parts 11, 12 are mounted between a fixed upper platen 14 and a lower platen 15 movable by a hydraulic ram 16.

A screw ram 17 is provided for introducing molten thermoplastic material 18 through a nozzle assembly 19 and sprue insert 20 to the mold space 13. The nozzle assembly is provided with a shut-off slide valve 21 actuated by a bell-crank lever 22 and a link 23 connected to a hydraulic cylinder 24. The valve is shown in its closed position at the end of the molding cycle which includes the introduction of the plastic material. The closed valve 21 prevents any return movement of the plastic material to the barrel of the screw ram 17. The screw ram may then be refilled with plastic material in preparation for the next molding cycle.

In this embodiment, the passageway through which pressurized gas is introduced to create a gas containing cavity 25 in the plastic material 18 is the bore of a pipe 26 connected to a supply 53. The supply pipe 26 enters the hub of a spider insert 27 in the nozzle assembly 19 and is then directed axially in the direction of flow of the plastic material to the desired position at which the gas is to be injected into the plastic material. The gas supply means 53 which supply pressurized gas to the pipe 26 are described in Specification No. 2139548. If desired, the pressurized gas may be introduced at a position other than through the nozzle assembly, for example directly into the article forming mold space 13 or at an intermediate position within the sprue or, as provided in some of the other embodiments described below, the runner system interconnecting the sprue to at least one article forming mold space.

In the lower mold part 12, at a position separate from the plastic material inlet and the pressurized gas inlet, there is provided a vent passage 30 which at its upstream or inner end, i.e. at the end adjacent the article forming mold space 13, is open to the mold space 13 and at its downstream or outer end, in this embodiment, is open to atmosphere. Alternatively, the outer end may be sealed and a branch passageway provided through the lower mold part 12 extending from the vent passage to an outlet which may be connected to a factory vent or a gas collecting chamber. The factory vent would avoid the discharge of gas into the work area of the molding machine. In the case of a gas collecting chamber being employed, the gas collected could be recirculated for use in a succeeding molding cycle.

Positioned in the inner end of the vent passage 30 is a retractable closure which, in this embodiment, is a pin 31 of smaller diameter than the bore of the vent passage 30, the pin extending lengthwise of the vent passage and being carried by the piston of an hydraulic, pneumatic or mechanical ram 32 for moving the pin between extended and retracted positions. In this embodiment, the ram is operated hydraulically by a solenoid operated control valve 33. In the extended position of the pin 31 (FIG. 1), a conical surface 34 of the pin engages a correspondingly shaped valve seat 35 thereby closing the vent passage 30 at its inner end which is also substantially blocked by the leading end of the pin. In this embodiment the leading end of the pin 31 is flush with the adjacent surface of the article forming mold space and is close fitting thereby preventing plastic material from entering the vent passage 30. Also, within a bore in the pin 31, is a cartridge heater 36 for maintaining the pin at a desired temperature, especially at its leading end. Control of the heater is by means of a heating controller 38.

Generally, the process of injection molding is the same as described in detail in British Patent Specification No. 2139548. It is thus sufficient to explain that at the start of the molding cycle, the pin 31 is maintained by the ram 32 in its extended position so that the vent passage 30 is closed. The screw ram 17 contains plastic material and the slide valve 21 is open. The machine is also set for delivering pressurized gas through the pipe 26.

Operation of the screw ram 17 introduces the plastic material 18 into the article forming mold space 13 through the nozzle assembly 19 and the sprue 20. Simultaneously a gas timer is started so that when the outlet end of the pipe 26 is immersed in plastic material, pressurized gas is introduced through the pipe into the plastic material. Pressurization in the gas is maintained whereby the gas in the plastic material causes the plastic material to flow throughout the mold space with the gas containing cavity within the plastic material, the cavity thereby extending with the plastic material until the plastic material has extended over the whole of the mold space. When the desired amount of plastic material has been introduced into the mold, the slide valve 21 is closed and the screw ram refilled with plastic material. Meanwhile, the supply of pressurized gas is terminated, but pressurisation in the gas within the cavity is maintained to hold the plastic material in the mold space positively against the mold surface as the plastic material solidifies and cools until the molding can itself sustain the form dictated by the mold surface.

It will be appreciated that during the molding operation a wall or layer of the plastic material is formed over the inner end of the vent passage and the leading end of the pin 31 in the vent passage (FIG. 1). However, in this embodiment, by means of the heater 36, under the control of the heating controller 38, this section of the cavity wall in the area of the inner end of the vent passage 30 is maintained soft relative to the remainder of the cavity wall. Then, on completion of the molding operation described above, the valve 33 is operated to cause the ram 32 to retract the pin 31. This movement of the pin 31 opens the valve 34, 35 and removes the support given by the pin for the soft section of the cavity wall. As a result, the gas pressure in the cavity 25 stretches the soft section of the cavity wall downwardly until it bursts or ruptures (FIG. 2) thereby creating a vent opening in the cavity wall in the area of the inner end of the vent passage 30 which allows the gas to pass from the cavity 25 through the vent passage to atmosphere. Alternatively, the gas may be fed from the vent passage 30, e.g. through a branch passage (not shown) in the lower mold part 12, to a factory vent or to a gas collecting chamber. After venting, the pressure within the cavity is equal to ambient pressure and the mold 10 is opened for removal of the molded article.

It will be appreciated that in the above described embodiment, opening of the cavity 25 for venting is achieved by allowing the gas pressure to burst or rupture the cavity wall to create a vent opening therein in the area of the inner end of the vent passage.

In alternative embodiments, shaping of the leading end of the pin can be employed to mechanically effect or assist in the creation of a vent opening in the cavity wall. For example, in FIG. 3, there is shown a construction of pin 31 in which the leading end or head of the pin projects into the interior of the mold and has a central recess 40 forming an upwardly facing wall or points 41 which become immersed in the cavity wall during the molding operation. The wall or points serve to produce weak lines 52 in the cavity wall whereby on retraction of the pin the gas pressure causes the section 42 of the cavity wall to rupture along the weak lines thereby creating a vent opening in the cavity wall in the area of the inner end of the vent passage for the gas to pass therethrough. This construction of pin is capable of operating with or without the application of additional heat to the pin head. In either case, the cavity wall will rupture on retraction of the pin 31 by the ram 32.

Figure 4:
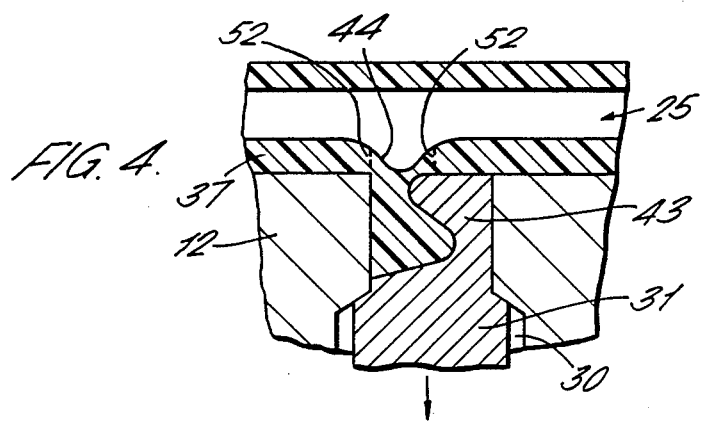
Figure 5:
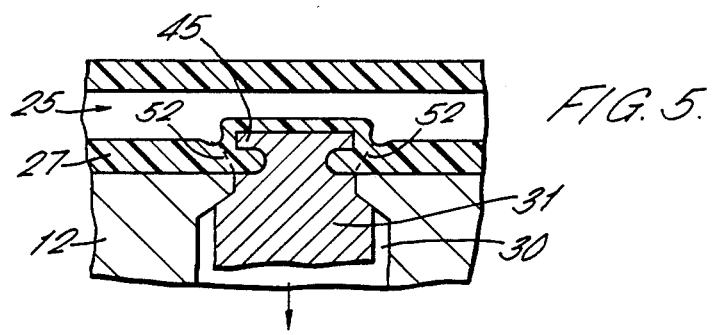

FIGS. 4 and 5 illustrate two examples of embodiment in which the leading end or head of the pin creates a mechanical lock with the plastic material which on retraction of the pin removes a section of the cavity wall downwardly with the pin thereby creating a vent opening in the cavity wall in the area of the inner end of the vent passage. In FIG. 4 the pin 31 has a head 43 which is undercut beneath the internal surface of the lower mold part 12. During the molding operation, a localised depression 44 (as shown) is formed above the deep portion of the plastic material which is locked to the pin thereby creating weak lines 52 along which the cavity wall will rupture. Similar weak lines 52 are also created in the construction of FIG. 5 in which the head 45 of the pin 31 protrudes upwardly into the interior of the mold and is undercut above the surface of the lower mold part 12. Again, each of these embodiments of pin may be employed with or without the use of a heater 36.

Full removal of a section of the cavity wall is not necessary, providing that the cavity wall is ruptured on retraction of the pin, whether by the pin itself or with the assistance of the gas pressure in the cavity, to create a vent opening. However, in the case of each embodiment in which retraction of the pin does effect the removal of a section of the cavity wall, it may be desirable to extract that portion of plastic material from the leading end of the pin between molding cycles. Alternatively, it may be allowed to remain, in which case during the succeeding molding cycle it will be resoftened and form part of the cavity wall of the next article.

Figure 3:
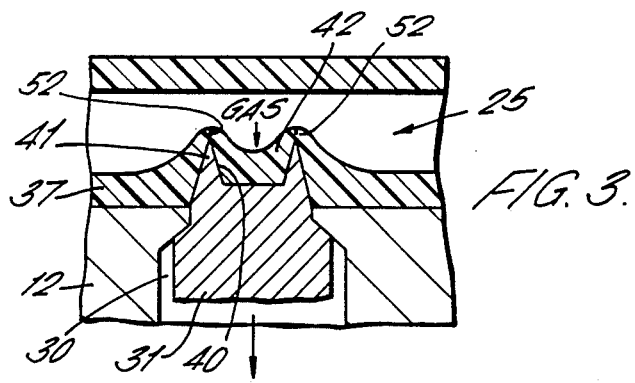
FIGS. 3 to 5 show modified gas venting pins.

The embodiments of FIGS. 6 to 9 are similar to the injection molding machine of FIGS. 1 to 3 and the molding process for each of these embodiments remains unchanged. The only differences are the formation of the mold space and the location of the or each gas vent pin.

Figure 6:
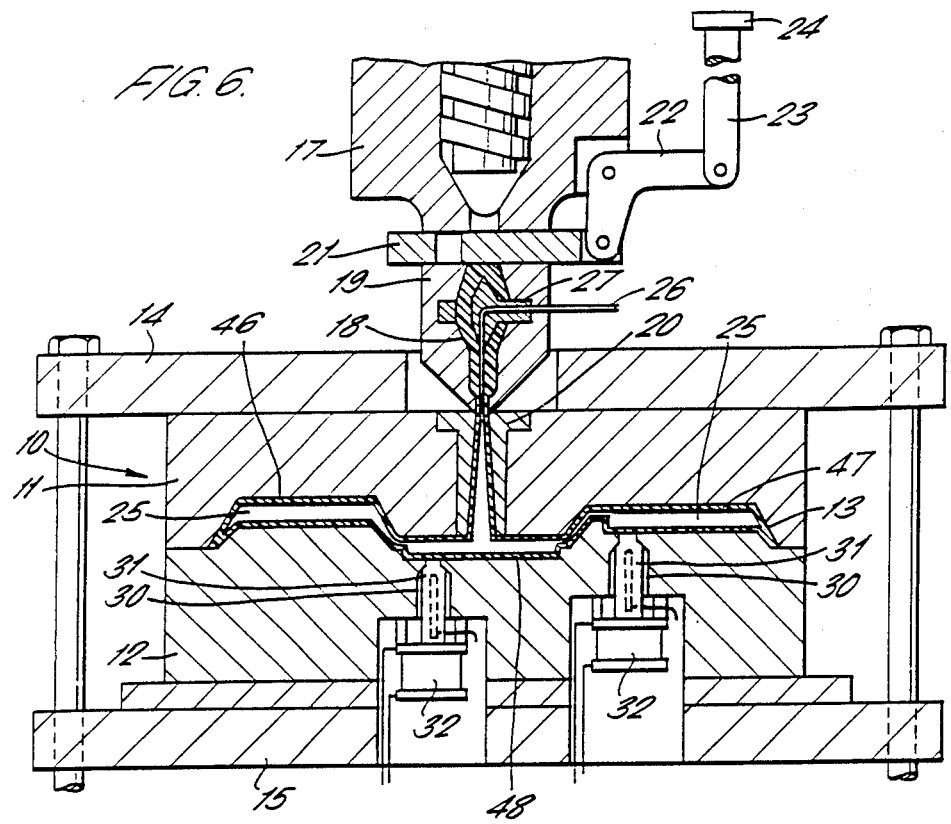
FIG. 6 shows another injection molding machine having two gas venting pins at different positions in the mold.

More particularly, in FIG. 6, the mold space 13 has two article forming portions 46, 47 interconnected by a common central portion 48. The downstream end of the sprue 20 opens into the central portion 48 which forms a runner feeding plastic material and the gas containing cavity therein to the two article forming portions 46, 47. Separate gas vent pins 31 are provided for venting the part of the gas containing cavity in each article forming portion. In this embodiment, the vent passage 30 associated with the right-hand article forming portion 47 is open to the article forming mold space 13, whilst the vent passage 30 associated with the left-hand article forming portion 46 is open to the common central portion 48. As shown, the gas containing cavity 25 formed during the molding process is united throughout both article forming portions 46, 47, the common central portion 48 and the sprue 20. Thereafter, operation of the rams 32 to retract the pins 31 creates two vent openings in the cavity wall which allow the gas to pass from the cavity 25 through the respective vent passage 30 to atmosphere.

In FIG. 7, the mold space 13 again has two article forming portions 46, 47 but there is only one vent passage 30 and associated vent pin 31 disposed centrally of the common interconnecting portion 48, and directly beneath the sprue 20. Retraction of the pin 31 allows gas to be vented from the cavity 25 extending throughout each article forming portion 46, 47, the common interconnecting portion 48 and the sprue 20.

Figure 8:
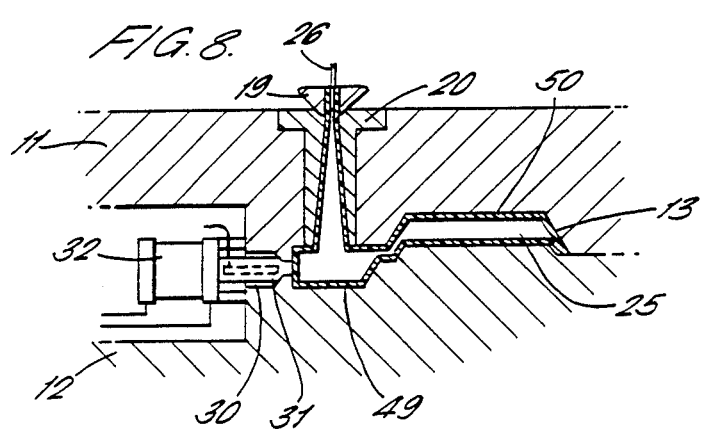

FIG. 8 illustrates an embodiment in which the downstream end of the sprue 20 is associated with an extension part 49 of the article forming portion 50 of the mold space 13. The vent passage and associated vent pin are also arranged at 90° to the sprue 20 to indicate that their position in the mold may be varied. If desired, the vent passage may be provided in the sprue insert 20 of the mold 10.

In the embodiment of FIG. 9, the downstream end of the sprue 20 and the vent passage 30 open directly into the article forming portion 51 of the mold space 13, one above the other.

The invention is not restricted to the details of the specific embodiments described above. For example, heating means for the pin or other closure in the vent passage may be provided in the surrounding wall of the vent passage rather than in the closure itself. Also, at least the part of the closure adjacent the cavity wall, e.g. the head of the pin in the above described embodiments, may be constructed of a material, for example beryllium copper alloy, which is efficient at retaining the heat transmitted thereto from heating means, as above, or from the plastic material or the mold itself, thereby further assisting the rupture of the cavity wall.

We claim:

1. A method of producing an injection molded plastic article comprising introducing a stream of molten plastic material from an injection molding machine cylinder into an article forming mold space, supplying pressurized gas into the interior of the molten plastic material to form a gas containing cavity therein, allowing the plastic material to solidify and cool sufficiently so that the article can itself sustain the form dictated by the mold surface, and venting the cavity to reduce the pressure within the cavity to ambient pressure prior to opening of the mold, the step of venting the cavity being achieved by providing at at least one position which is separate from the plastic inlet and the gas inlet a vent passage in the mold open at its inner end to a part of the interior of the mold at which the gas containing cavity is formed, and a retractable closure for opening and closing the vent passage at its inner end, maintaining the closure in its closed position during the forming of the article whereby the cavity wall is formed over the inner end of the vent passage and the closure therefor, and subsequently retracting the closure to allow the creation of a vent opening in the cavity wall in the area of the inner end of the vent passage through which vent opening gas from the cavity passes into the vent passage.

2. A method as claimed in claim 1, wherein on retraction of the closure the cavity wall is unsupported and the pressure of the gas within the cavity ruptures the cavity wall and thereby creates the vent opening.

3. A method as claimed in claim 1, including immersing a part of the closure in the cavity wall as it is formed to produce weak lines in the cavity wall whereby on retraction of the closure the weak lines assist the pressure of the gas to rupture the cavity wall and thereby create the vent opening.

4. A method as claimed in claim 1, including immersing a part of the closure in the cavity wall as it is formed to produce weak lines in the cavity wall whereby on retraction of the closure the weak lines assist the removal of a section of the cavity wall and thereby the creation of the vent opening.

5. A method as claimed in claim 4, wherein the part of the closure to be immersed is undercut whereby retraction of the closure pulls said section from the cavity wall.

6. A method as claimed in claim 1, including the step of applying heat at the inner end of the vent passage to assist the creation of the vent opening.

7. A method as claimed in claim 6, wherein the heat is applied by heating the closure.

8. Apparatus for producing an injection molded plastic article comprising means for introducing a stream of molten plastic material from an injection molding machine cylinder into an article forming mold space, means for supplying pressurized gas into the interior of the molten plastic material to form a gas containing cavity therein, and at at least one position which is separate from the plastic inlet and the gas inlet a vent passage in the mold open at its inner end to a part of the interior of the mold at which the gas containing cavity is to be formed, a retractable closure positioned in the inner end of the vent passage for movement between an extended position in which the vent passage is closed and a retracted position in which the vent passage is open, and means for moving the closure between its extended and retracted positions.

9. Apparatus as claimed in claim 8, wherein the inner end of the vent passage is open to the article forming mold space.

10. Apparatus as claimed in claim 8, wherein the inner end of the vent passage is open to a part of the interior of the mold which is upstream of the article forming mold space.

11. Apparatus as claimed in claim 8, wherein the closure has a conical surface which engages a correspondingly shaped valve seat in the vent passage when the closure is in its extended position thereby closing the vent passage.

12. Apparatus as claimed in claim 8, wherein a part of the closure, in its extended position, becomes immersed in the cavity wall as it is formed.

13. Apparatus as claimed in claim 12, wherein said part of the closure, in its extended position, protrudes into the interior of the mold.

14. Apparatus as claimed in claim 12, wherein said part of the closure is shaped to assist the removal of a section from the cavity wall when the closure is retracted.

15. Apparatus as claimed in claim 12, wherein the closure is undercut to provide a head which becomes immersed in the cavity wall as it is formed.

16. Apparatus as claimed in claim 8, wherein the closure is a pin extending lengthwise of the vent passage.

17. Apparatus as claimed in claims 8, including means for applying heat at the inner end of the vent passage.

18. Apparatus as claimed in claim 17, wherein the heating means are provided internally of the closure.

19. Apparatus as claimed in claim 8, wherein the means for moving the closure is a piston and cylinder.

20. Apparatus as claimed in claim 8, wherein the outer end of the vent passage is open to atmosphere.

* * * * *